(No Model.)

T. MIDGLEY.
WIRE BELTING.

No. 410,251. Patented Sept. 3, 1889.

WITNESSES
Geo. G. Thorpe
L. B. Whitaker

INVENTOR
Thomas Midgley
By Johnston, Rundle & Dyer
Attorneys

United States Patent Office.

THOMAS MIDGLEY, OF BEAVER FALLS, PENNSYLVANIA, ASSIGNOR OF ONE-HALF TO JAMES E. EMERSON, OF SAME PLACE.

WIRE BELTING.

SPECIFICATION forming part of Letters Patent No. 410,251, dated September 3, 1889.

Application filed July 15, 1889. Serial No. 317,537. (No model.)

*To all whom it may concern:*

Be it known that I, THOMAS MIDGLEY, a citizen of the United States, residing at Beaver Falls, in the county of Beaver and State of Pennsylvania, have invented certain new and useful Improvements in Wire Belting; and I do hereby declare the following to be a full, clear, and exact description of the invention, such as will enable others skilled in the art to which it appertains to make and use the same.

My invention relates to wire belting, and has especial reference to the construction of belting for use in places where sudden heavy strains are produced by bringing heavy machinery into use.

The stretched wire belting, for which numerous patents have been granted, possesses the quality of flexibility, but it is not elastic, for the reason that the helices of which the belt is composed have been stretched to their full extent, and each transverse section is seated in the ends of the adjacent sections. Leather and rubber belts also possess the quality of flexibility, but they, like the stretched wire belt, are wanting in the quality of elasticity, and in each of the kinds of belts enumerated any sudden strain produced by the cause enumerated is transmitted to the engine or other driving-power, producing great wear and tear upon its working parts.

It is my purpose to provide a belt having the quality of being both flexible or pliable and sufficiently elastic or resilient to take up the strain now usually transmitted by the belt to the engine, and of sufficient strength, so that it will not stretch under the nominal load of the engine or the resistance of the machinery being driven.

The invention will be hereinafter described, and particularly pointed out in the claims.

Figure 1:
Figure 2:
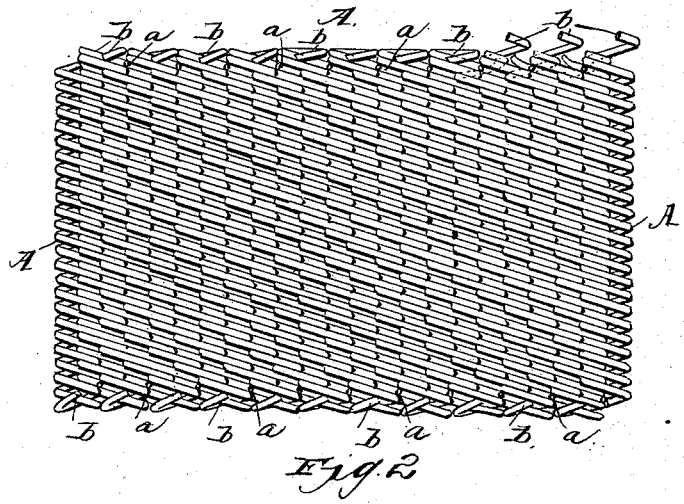
Figure 3:
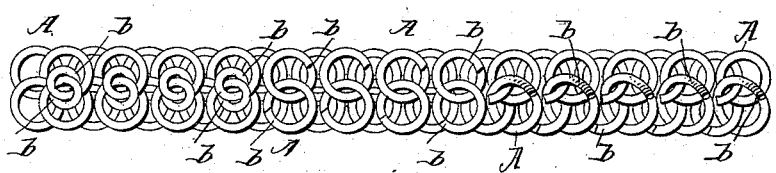
Figure 4:
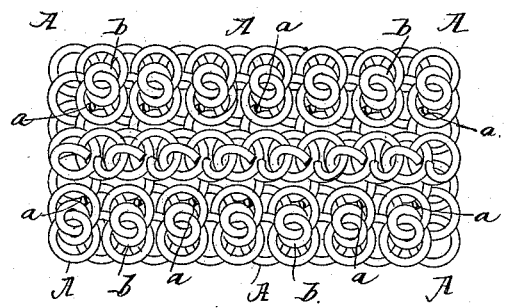

In the accompanying drawings, which form part of this specification, Figure 1 represents a plan of a section of coiled wire; Fig. 2, a plan of a section of belting composed of two layers of sections of coiled wire; Fig. 3, an edge view showing the belting in its several stages of construction, and Fig. 4 is a similar view of a section of belting composed of several layers of sections of coiled wire.

Reference being had to the drawings and the letters thereon, A indicates a section of coiled spring-tempered wire, made of various gages according to the strength of the belt required. The pitch of the spirals or helices is made to afford space for each section to engage with two or more sections throughout the width of the belt, or sheet from which the belt is made, and to prevent the sections from being pressed down into each other when in use. The proper gage of wire and the pitch of the spirals or helices having been determined, the wire is coiled into sections, as A, of any desired length, and intertwined in two or more plies or layers, according to the strength of belt required.

In intertwining the sections A in the lower layer of the sheet each section engages with two adjacent sections, and in the upper layer each section engages with one of the sections of the lower layer and with the two adjacent sections in the upper layer, thus making each section engage with three other sections and form a union of the upper and lower layers.

In constructing a three-ply belt, or a belt of three layers of sections, each of the sections in the middle layer engages with one section in the lower layer, two in the middle layer, and one in the upper layer, making each section of the middle layer engage with four other sections in the belt. The same rule prevails in belts of any greater ply or number of layers of sections.

To form a working-edge on the belt, each section is cut off one-half a coil alternately on opposite sides or edges of the belt, as shown at *a a*, and the protruding ends *b b* of an upper and a lower coil or section are bent over each other and back into the body of the belt, thus securely locking the sections against disengagement and forming a neat, smooth working-edge which will not tear the hand of a workman using or handling the belt. The ends of the belt, after having been stretched over pulleys or over the main drive-wheel of an engine and a pulley on the main shaft of a shop or factory, are joined by intertwining two or more of the sections A in the manner the belt was formed, according to the number of layers in the belt, thus constituting an endless belt of uniform strength, and without the interposition of a lacing or fastener of any material and in any form other than that of which the belt is composed.

The belt may be shortened at any time by unlocking the bent ends $b\ b$ of any sections at any point in the belt and unscrewing them from the belt, when the ends of the belt may again be joined and secured, as in the first instance.

In Fig. 4 is shown a belt of seven plies or layers of sections A, designed for use in hoisting and other machinery where great strength is required. In this construction the sections A are secured together in layers, as in those hereinbefore described, and the edges are formed by cutting the ends of two of the layers of sections A off back in the body of the belt, as at $a$, and then folding or bending the ends $b\ b$ over each other in pairs, making three separate layers or rows of folds on each edge, the middle row being formed by bending the ends of adjacent sections in the middle layer. When the outer layer or working-surface becomes worn, it may be removed by unscrewing the sections A of the worn layer and inserting a layer of new sections, as in the original construction of the belt; or the belt may be used for lighter work after the worn layer of sections has been removed; or the belt may be reversed and worked on the opposite side from that which has become worn without removing the worn layer.

When iron pulleys are used, they should be covered with leather or coated with an adhesive substance, such as rubber.

Having thus fully described my invention, what I claim is—

1. Wire belting composed of layers of intertwined transverse sections of coiled spring-tempered wire, having the ends of adjacent sections interlocked at the edge of the belt, substantially as described.

2. Wire belting composed of a plurality of layers of intertwined transverse sections of coiled wire, having the edges of the belting formed of interlocked ends of the sections in one layer with the ends of the sections in an adjacent layer, substantially as described.

3. Wire belting composed of a plurality of layers of intertwined transverse sections of coiled wire, the edges of the belting having a plurality of separate longitudinal layers or rows of interlocked ends of the sections of which the belting is composed, substantially as described.

In testimony whereof I affix my signature in presence of two witnesses.

THOMAS MIDGLEY.

Witnesses:
J. F. MERRIMAN,
J. W. RAMSEY.